US011648531B2

(12) United States Patent
Min et al.

(10) Patent No.: US 11,648,531 B2
(45) Date of Patent: May 16, 2023

(54) METHOD FOR PREPARING SUPER ABSORBENT POLYMER

(71) Applicant: LG Chem, Ltd., Seoul (KR)

(72) Inventors: Yoon Jae Min, Daejeon (KR); Jong Hun Song, Daejeon (KR); Gicheul Kim, Daejeon (KR); Jae Yul Kim, Daejeon (KR); Heechang Woo, Daejeon (KR)

(73) Assignee: LG Chem, Ltd.

( * ) Notice: Subject to any disclaimer, the term of this patent is extended or adjusted under 35 U.S.C. 154(b) by 158 days.

(21) Appl. No.: 16/955,406

(22) PCT Filed: Aug. 16, 2019

(86) PCT No.: PCT/KR2019/010417
§ 371 (c)(1),
(2) Date: Jun. 18, 2020

(87) PCT Pub. No.: WO2020/101150
PCT Pub. Date: May 22, 2020

(65) Prior Publication Data
US 2020/0406228 A1    Dec. 31, 2020

(30) Foreign Application Priority Data
Nov. 14, 2018    (KR) .................. 10-2018-0139898

(51) Int. Cl.
| B01J 20/26 | (2006.01) |
| B01J 20/28 | (2006.01) |
| B01J 20/30 | (2006.01) |
| C08F 120/06 | (2006.01) |
| C08F 2/16 | (2006.01) |

(52) U.S. Cl.
CPC ........... B01J 20/261 (2013.01); B01J 20/267 (2013.01); B01J 20/28004 (2013.01); B01J 20/28047 (2013.01); B01J 20/3021 (2013.01); C08F 2/16 (2013.01); C08F 120/06 (2013.01); B01J 2220/68 (2013.01)

(58) Field of Classification Search
CPC .. B01J 20/261; B01J 20/267; B01J 20/28004; B01J 20/28047; B01J 20/3021; C08F 2/16; C08F 120/06
See application file for complete search history.

(56) References Cited

U.S. PATENT DOCUMENTS

| 6,291,636 B1 | 9/2001 | Miyake et al. | |
| 6,641,064 B1 | 11/2003 | Dentler et al. | |
| 7,803,880 B2 * | 9/2010 | Torii | A61L 15/60 |
| | | | 502/402 |
| 11,161,942 B2 * | 11/2021 | Park | B29B 9/12 |
| 2008/0234420 A1 | 9/2008 | Smith et al. | |
| 2009/0194462 A1 | 8/2009 | Stueven et al. | |
| 2010/0100066 A1 | 4/2010 | Azad et al. | |
| 2012/0016084 A1 | 1/2012 | Dairoku et al. | |
| 2012/0220745 A1 | 8/2012 | Machida et al. | |
| 2014/0066584 A1 | 3/2014 | Peterson et al. | |
| 2018/0056274 A1 | 3/2018 | Lee et al. | |
| 2019/0077924 A1 | 3/2019 | Lee et al. | |
| 2019/0329220 A1 | 10/2019 | Watabe et al. | |

FOREIGN PATENT DOCUMENTS

| EP | 1367081 A1 | 12/2003 |
| EP | 1400556 A1 | 3/2004 |
| EP | 0948997 B1 | 7/2005 |
| EP | 2253375 A1 | 11/2010 |
| EP | 2415822 A1 | 2/2012 |
| EP | 2479196 A1 | 7/2012 |
| EP | 2565219 A1 | 3/2013 |
| JP | H11292919 A | 10/1999 |
| JP | 2004051967 A | 2/2004 |
| JP | 2010504417 A | 2/2010 |
| JP | 2012505940 A | 3/2012 |
| JP | 5631866 B2 | 11/2014 |
| JP | 2015048386 A | 3/2015 |
| JP | 2020509569 A | 3/2020 |
| KR | 20100014556 A | 2/2010 |
| KR | 20120047035 A | 5/2012 |
| KR | 20160141666 A | 12/2016 |
| KR | 20170092314 A | 8/2017 |
| KR | 20170096322 A | 8/2017 |
| KR | 20180076272 A | 7/2018 |
| WO | 2010114058 A1 | 10/2010 |
| WO | 2011034146 A1 | 3/2011 |
| WO | 2011034147 A1 | 3/2011 |
| WO | 2018092864 A1 | 5/2018 |

OTHER PUBLICATIONS

International Search Report for Application No. PCT/KR2019/010417 dated Dec. 12, 2019, 2 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.
Fredric Buchholz, et al., "Modern Superabsorbent Polymer Technology", 1998, 50 pages, John Wiley & Sons, Inc., New York.
Third Party Observation for PCT/KR2019/010417 dated Mar. 8, 2021.
Extended European Search Report including Written Opinion for Application No. EP19885013.3 dated Feb. 2, 2021, 12 pgs.
Third Party Observation fo Application No. EP20190885013 dated Jan. 22, 2021.

* cited by examiner

Primary Examiner — Yong L Chu
(74) Attorney, Agent, or Firm — Lerner David LLP

(57) ABSTRACT

The method for preparing a super absorbent polymer according to the present disclosure reduces the generating amount of a fine powder while realizing the same particle size distribution in the process of pulverizing the dried polymer, thereby reducing the load of the fine powder reassembly, drying, pulverizing and classifying steps.

5 Claims, No Drawings

METHOD FOR PREPARING SUPER ABSORBENT POLYMER

CROSS-REFERENCE TO RELATED APPLICATION(S)

The present application is a national phase entry under 35 U.S.C. § 371 of International Application No. PCT/KR2019/010417 filed Aug. 16, 2019, which claims priority to Korean Patent Application No. 10-2018-0139898 filed on Nov. 14, 2018, the disclosures of which are incorporated herein by reference in their entirety.

TECHNICAL FIELD

The present disclosure relates to a method for preparing a super absorbent polymer capable of reducing the generation of a fine powder.

BACKGROUND ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for production of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of sanitary materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, the super absorbent polymer needs to basically exhibit high absorption capacity and absorption rate.

In particular, a super absorbent polymer having an increased surface area has been prepared to exhibit a fast absorption rate. The surface area is increased and the structural strength of the super absorbent polymer is weak, so a lot of fine powder is generated in the coarse pulverizing process. Fine powder not only deteriorates the working environment, but also has a problem in that the process load is increased due to the recycling process of fine powder. Thereby, there is a need for a preparation method capable of reducing the generation of fine powder while maintaining the physical properties of the super absorbent polymer.

DETAILED DESCRIPTION OF THE INVENTION

Technical Problem

It is an object of the present disclosure to provide a method for preparing a super absorbent polymer capable of reducing the generation of fine powder while maintaining excellent physical properties of the super absorbent polymer.

Technical Solution

In order to achieve the above object, one aspect of the present disclosure provides a method for preparing a super absorbent polymer comprising the following steps:

performing crosslinking polymerization of a water-soluble ethylenically unsaturated monomer having an acidic group of which at least a part is neutralized, in the presence of an internal crosslinking agent and a polymerization initiator to form a hydrogel polymer containing a first crosslinked polymer (step 1);

drying the hydrogel polymer (step 2);

pulverizing the dried polymer so that particles having a diameter of 710 μm or more are equal to or higher than 70.0 wt % based on the total weight of the prepared entire particles, thereby preparing particles (step 3); and subjecting the pulverized particles to secondary pulverization (step 4).

The method for preparing a super absorbent polymer largely includes a step of polymerizing a water-soluble ethylenically unsaturated monomer to prepare a hydrogel polymer, and a step of drying and the polymer and then pulverizing it. In order to maximize the properties of the super absorbent polymer, it must be prepared in the form of particles, and in particular, when prepared in the form of particles having a diameter of 150 μm to 850 μm (180 to 850 μm, or 300 to 850 μm), the properties as a super absorbent polymer are sufficiently exhibited and thus, a pulverizing step is essentially required.

By the way, when the hydrogel polymer is pulverized in order to pulverize in the above diameter range, particles having a diameter of 150 μm or less (or 180 μm or less) are prepared, which is generally called 'fine powder'. First, there is a problem that the fine powder is scattered in the production process. In addition, since the fine powder is not simply discarded, but is recycled by adding water to the fine powder, re-assembling and again pulverizing it, there is a problem that as the amount of fine powder generated increases, the process load increases. In particular, recently, in order to realize a high absorption rate of the super absorbent polymer, there is a tendency to increase the surface area of the hydrogel polymer. However, as the surface area increases, the structural strength becomes weaker, and when pulverizing the polymer, the generating amount of fine powder is further increased.

Thus, the present disclosure is characterized by limiting the pulverizing conditions so that the amount of fine powder generated during pulverization of the hydrogel polymer can be reduced, as described below, and it is possible to improve the preparation method of the super absorbent polymer while maintaining the physical properties of the super absorbent polymer.

Hereinafter, the present disclosure will be described in detail for each step.

(Step 1)

Step 1 is a step of forming a hydrogel polymer containing a first crosslinked polymer by performing crosslinking polymerization of a water-soluble ethylenically unsaturated monomer having an acidic group of which at least a part is neutralized, in the presence of an internal crosslinking agent and a polymerization initiator.

The water-soluble ethylenically unsaturated monomer constituting the first crosslinked polymer may be any monomer commonly used for the preparation of a super absorbent polymer. As a non-limiting example, the water-soluble ethylenically unsaturated monomer may be a compound represented by the following Chemical Formula 1:

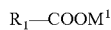  [Chemical Formula 1]

in Chemical Formula 1, $R_1$ is an alkyl group having 2 to 5 carbon atoms containing an unsaturated bond, and $M^1$ is a hydrogen atom, a monovalent or divalent metal, an ammonium group or an organic amine salt.

Preferably, the monomer may be one or more selected from the group consisting of acrylic acid, methacrylic acid, and monovalent metal salts, divalent metal salts, ammonium salts, and organic amine salts of these acids. When an acrylic acid or a salt thereof is used as the water-soluble ethylenically unsaturated monomer in this way, it is advantageous in that a super absorbent polymer having improved water absorptivity is obtained. In addition, as the monomer, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, (meth)acrylamide, N-substituted (meth)acrylate, 2-hydroxyethyl(meth)acrylate, 2-hydroxypropyl(meth)acrylate, methoxypolyethyleneglycol(meth)acrylate, polyethyleneglycol(meth)acrylate, (N,N)-dimethylaminoethyl(meth)acrylate, (N,N)-dimethylaminopropyl(meth)acrylamide, and the like may be used.

Here, the water-soluble ethylenically unsaturated monomer may be those having an acidic group of which at least a part is neutralized. Preferably, the monomer may be those in which the monomer is partially neutralized with an alkaline substance such as sodium hydroxide, potassium hydroxide, ammonium hydroxide or the like.

In this case, the degree of neutralization of the monomer may be 40 to 95 mol %, or 40 to 80 mol %, or 45 to 75 mol %. The range of the degree of neutralization may vary depending on the final physical properties. An excessively high degree of neutralization causes the neutralized monomers to be precipitated, and thus polymerization may not readily occur, whereas an excessively low degree of neutralization not only greatly deteriorates the absorbency of the polymer but also endows the polymer with hard-to-handle properties, like elastic rubber.

In addition, the concentration of the water-soluble ethylenically unsaturated monomer in the monomer mixture may be properly controlled in consideration of a polymerization time and reaction conditions, and the concentration may be 20 to 90% by weight, or 40 to 65% by weight. These concentration ranges may be advantageous for adjusting the pulverization efficiency during pulverization of the polymer described below, without needing to remove unreacted monomers after polymerization by using the phenomenon of gel effect occurring in the polymerization reaction of the highly concentrated aqueous solution. However, when the concentration of the monomer is excessively low, the yield of the super absorbent polymer may be lowered. On the contrary, if the concentration of the monomer is excessively high, it may arise problems processes, for example, a part of the monomers may be precipitated, or the pulverization efficiency may be lowered during pulverization of the polymerized hydrogel polymer, etc., and the physical properties of the super absorbent polymer may be deteriorated.

Further, as the internal crosslinking agent, any compound can be used as long as it enables introduction of a crosslink bond upon polymerization of the water-soluble ethylenically unsaturated monomer. Non-limiting examples thereof may include multifunctional crosslinking agents, such as N,N'-methylenebisacrylamide, trimethylolpropane tri(meth)acrylate, ethylene glycol di(meth)acrylate, polyethylene glycol (meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto.

Such an internal crosslinking agent may be added at a concentration of about 0.001 to 1% by weight based on the monomer composition. That is, when the concentration of the internal crosslinking agent is too low, the absorption rate of the polymer is lowered and the gel strength may be weakened, which is thus not preferable. Conversely, when the concentration of the internal crosslinking agent is too high, the absorption capacity of the polymer is lowered, which may be undesirable as an absorber.

Further, in step 1, a polymerization initiator commonly used for the preparation of a super absorbent polymer can be included. As a non-limiting example, the polymerization initiator may be a thermal polymerization initiator or a photo-polymerization initiator, depending on a polymerization method. However, even in the case of performing the photo-polymerization method, a certain amount of heat is generated by ultraviolet irradiation or the like. Further, a certain amount of heat may be generated with the progress of exothermic polymerization reaction. Therefore, the thermal polymerization initiator may be further included.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), and the like. Further, examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid) and the like. More various thermal polymerization initiators are well disclosed in "Principle of Polymerization" written by Odian, (Wiley, 1981), p 203, which may be incorporated herein by reference. Preferably, ascorbic acid and potassium persulfate are used as the thermal polymerization initiator.

The photo-polymerization initiator may be, for example, one or more compounds selected from the group consisting of benzoin ether, dialkyl acetophenone, hydroxyl alkylketone, phenyl glyoxylate, benzyl dimethyl ketal, acyl phosphine and α-aminoketone. As the specific example of acyl phosphine, commercially available Lucirin TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, which may be incorporated herein by reference.

Such polymerization initiator may be added at a concentration of about 0.001 to 1% by weight with respect to the monomer composition. That is, if the concentration of the polymerization initiator is too low, the polymerization rate becomes low and a large amount of residual monomers may be extracted from the final product, which is not preferable. On the contrary, if the concentration of the polymerization initiator is too high, a polymer chain making up a network may become short, and thus, the physical properties of polymer may be degraded such as increase in the content of water-soluble components and decrease in absorbency under pressure, which is not preferable.

Further, step 1 may be performed in the presence of a foaming agent. The foaming agent acts to cause foaming during polymerization to form pores in the hydrogel polymer, thereby increasing the surface area. As the foaming agent, an inorganic forming agent or an organic forming agent can be used. As an example of the inorganic foaming agent, sodium bicarbonate, sodium carbonate, potassium bicarbonate, potassium carbonate, calcium bicarbonate, calcium carbonate, magnesium bicarbonate or magnesium carbonate can be mentioned. As an example of the organic foaming agent, azodicarbonamide (ADCA), dinitroso pentamethylene tetramine (DPT), p,p'-oxybisbenzenesulfonylhydrazide (OBSH), and p-toluenesulfonyl hydrazide (TSH) can be mentioned.

Further, the foaming agent is preferably used in an amount of 0.001 to 1% by weight based on the weight of the water-soluble ethylenically unsaturated monomer. When the amount of the foaming agent used is more than 1% by weight, the pores become too large, the gel strength of the super absorbent polymer lowers and the density becomes low, which may cause problems in distribution and storage.

In addition, the monomer composition may further include additives such as a surfactant, a thickener, a plasticizer, a preservation stabilizer, an antioxidant, etc., if necessary.

Such a monomer composition can be prepared in the form of a solution in which raw materials such as the above-mentioned monomer are dissolved in a solvent. In this case, any usable solvent can be used without limitation in the constitution as long as it can dissolve the above-mentioned raw materials. Examples of the solvent may include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

Further, the formation of the hydrogel polymer through polymerization of the monomer composition may be performed by a general polymerization method, and the process is not particularly limited. As a non-limiting example, the polymerization method are largely classified into a thermal polymerization and a photo-polymerization according to the type of the polymerization energy source, and the thermal polymerization may be carried out in a reactor like a kneader equipped with agitating spindles and the photo-polymerization may be carried out in a reactor equipped with a movable conveyor belt.

As an example, the monomer composition is injected into a reactor like a kneader equipped with the agitating spindles, and thermal polymerization is performed by providing hot air thereto or heating the reactor, thereby obtaining the hydrogel polymer. In this case, the hydrogel polymer, which is discharged from the outlet of the reactor according to the type of agitating spindles equipped in the reactor, may be obtained as particles with a size of centimeters or millimeters. Specifically, the hydrogel polymer may be obtained in various forms according to the concentration of the monomer composition injected thereto, the injection speed, or the like, and the hydrogel polymer having a (weight average) particle diameter of 2 to 50 mm may be generally obtained.

As another example, when the photo-polymerization of the monomer composition is performed in a reactor equipped with a movable conveyor belt, a sheet-shaped hydrogel polymer may be obtained. In this case, the thickness of the sheet may vary depending on the concentration of the monomer composition injected thereto and the injection speed, and the polymer sheet is preferably controlled to have typically a thickness of 0.5 to 5 cm in order to secure the production speed or the like while enabling a uniform polymerization of the entire sheet.

In this case, the hydrogel polymer obtained by the above-mentioned method may have a water content of 40 to 80% by weight. Meanwhile, the "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 180° C. and then the temperature may be maintained at 180° C., and the total drying time may be set to 20 minutes, including 5 minutes for the temperature rising step.

(Step 2)

Step 2 is a step of drying the hydrogel polymer prepared in step 1, which is a step of preparing the pulverization of step 3 described below.

First, when drying the hydrogel polymer, a step of coarse pulverization may be further carried out before drying in order to increase the efficiency of the drying step, if necessary. A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarse pulverizing step may be performed so that the hydrogel polymer has a particle size of about 2 mm to about 10 mm. Pulverizing the hydrogel polymer into a particle size of less than 2 mm is technically not easy due to a high water content of the hydrogel polymer, and a phenomenon of agglomeration may occur between the pulverized particles. Meanwhile, if the hydrogel polymer is pulverized into a particle size of larger than 10 mm, the effect of increasing the efficiency in the subsequent drying step may be insignificant.

The hydrogel polymer coarsely pulverized as above or immediately after polymerization without the coarsely pulverizing step is subjected to a drying step. At this time, the drying temperature may be 50 to 250° C. When the drying temperature is less than 50° C., it is likely that the drying time becomes too long or the physical properties of the super absorbent polymer finally formed is deteriorated. When the drying temperature is higher than 250° C., only the surface of the polymer is excessively dried, and thus fine powder may be generated during the subsequent pulverization process and the physical properties of the super absorbent polymer finally formed may be deteriorated. More preferably, the drying may be performed at a temperature of 150 to 200° C., and more preferably at a temperature of 160 to 190° C. Meanwhile, the drying step may be carried out for 20 minutes to 15 hours, in consideration of the process efficiency, but is not limited thereto.

In the drying step, any drying method may be selected and used without limitation in the constitution if it is a method commonly used in the relevant art. Specifically, the drying step may be carried out by a method such as hot air supply, infrared irradiation, microwave irradiation or ultraviolet irradiation. When the drying step as above is finished, the water content of the polymer may be 0.05 to 10% by weight.

(Step 3)

Step 3 is a step of pulverizing the polymer dried in step 2 to prepare particles, and in the present specification, it is referred to as 'primary pulverization' in order to distinguish it from the pulverization step of step 4 described below.

In the present disclosure, in order to reduce the generation of a fine powder, the polymer is pulverized through the primary pulverization so that particles having a diameter of 710 μm or more are equal to or higher than 70.0 wt % based on the total weight of the prepared entire particles.

Conventionally, in the preparation of a super absorbent polymer, excessive pulverization is performed in order to prepare particles having a diameter of 150 μm to 850 μm (180 to 850 μm, or 300 to 850 μm), whereby particles having the above diameter may be prepared, but there is a problem in that the generation of fine powder is relatively increased. Thus, in the present disclosure, the pulverization conditions are relaxed to produce many particles with a relatively large diameter, thereby reducing the generation of a fine powder. Further, since particles with a relatively large diameter are prepared, in order to produce particles having a diameter of 150 μm to 850 μm (180 to 850 μm, or 300 to 850 μm), 'secondary pulverization' is performed as in step 4 described below.

Preferably, in the particles prepared through step 3, particles having a diameter of 710 μm or more are pulverized so as to be 75.0 wt % or more, 80.0 wt % or more, or 85.0 wt % or more, based on the total weight of the prepared entire particles. Further, the particles having a diameter of 710 μm or more are pulverized so as to be 99 wt % or less, 95 wt % or less, 90 wt % or less, or 85 wt % or less of the prepared entire particles. At this time, particles having a diameter of 710 μm or more preferably have a maximum diameter of 10 mm or less.

Preferably, in the particles prepared through step 3, particles having a diameter of less than 180 μm (or less than 150 μm) are pulverized so as to be 8.0 wt % or less, 5.0 wt % or less, 3.0 wt % or less, or 1.0 wt % or less, based on the total weight of the prepared entire particles.

Meanwhile, a pulverizing machine is used for the pulverization, and specifically, a ball mill, a pin mill, a hammer mill, a screw mill, a roll mill, a disc mill, a jog mill or the like may be used, but it is not limited to the above-mentioned examples.

In addition, the particles having a diameter of less than 150 μm (or less than 180 μm) among the particles prepared in step 3 may be discarded, or may be reassembled by adding water, and circulated to step 2.

(Step 4)

Step 4 is a step of again pulverizing the particles pulverized in step 3, and in the present specification, it is referred to as 'secondary pulverization' in order to distinguish it from the pulverization step of step 3 described above.

As described above, since many particles having a relatively large diameter were prepared in step 3, secondary pulverization is performed to produce particles having a diameter of 150 μm to 850 μm (180 to 850 μm, or 300 to 850 μm). At this time, as the pulverizing machine that can be used, a pulverizing machine described in step 3 may be used.

Preferably, in step 4, only the particles having a large diameter among the particles prepared in step 3 may be selectively subjected to second pulverization. As described above, since many particles having a relatively large diameter are prepared in step 3, only particles having a large diameter are again pulverized, and thereby, the diameter distribution of the finally prepared particles can be appropriately adjusted. Further, the particles thus prepared may be combined with particles not subjected to secondary pulverization among the particles prepared in step 3.

Specifically, step 4 determines a reference diameter among a diameter range of 600 μm or more and 850 μm or less, and only the particles having a diameter equal to or greater than the reference diameter among the particles prepared in step 3 is preferably subjected to secondary pulverization. The reference diameter is 600 μm, 610 μm, 620 μm, 630 μm, 640 μm, 650 μm, 660 μm, 670 μm, 680 μm, 690 μm, 700 μm, 710 μm, 720 μm, 730 μm, 740 μm, or It may be 750 μm, preferably 710 μm.

Further, in the particles prepared by the secondary pulverization, a step of classifying into particles having a diameter of 850 μm or less and 180 μm or more and particles having a diameter of less than 180 μm on the basis of diameters of 850 μm and 180 μm may be added. Alternatively, in the particles prepared by the secondary pulverization, a step of classifying into particles having a diameter of 850 μm or less and 150 μm or more and particles having a diameter of less than 150 μm on the basis of diameters of 850 μm and 150 μm may be added.

In addition, particles having a diameter of 850 μm or less and 150 μm or more (or 180 μm or more) prepared as above may be used as a super absorbent polymer.

(Other Steps)

In addition, the present disclosure may include a step of crosslinking the surface of the prepared particles as necessary. Specifically, it may further include a step of heat-treating the prepared particles and crosslinking the surface in the presence of a surface crosslinking solution.

The surface crosslinking solution may include any one or more surface crosslinking agents selected from the group consisting of compounds having two or more epoxy rings, and compounds having two or more hydroxy groups.

Preferably, the surface crosslinking solution includes both compounds having two or more epoxy rings and compounds having two or more hydroxy groups. In this case, the surface crosslinking solution includes a compound having two or more epoxy rings and a compound having two or more hydroxy groups in a ratio of 1:1.1 to 1:5.

Examples of the compound having two or more epoxy rings include one or more compounds selected from the group consisting of ethylene glycol diglycidyl ether, polyethylene glycol diglycidyl ether, glycerol polyglycidyl ether, propylene glycol diglycidyl ether, polypropylene glycol diglycidyl ether, 1,4-butanediol diglycidyl ether, 1,4-cyclohexanedimethanol diglycidyl ether, hexahydrophthalic anhydride diglycidyl ether, neopentyl glycol diglycidyl ether, bisphenol A diglycidyl ether, and N,N-diglycidylaniline. Preferably, ethylene glycol diglycidyl ether is used.

Examples of the compound having two or more hydroxy groups include one or more compounds selected from the group consisting of ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylolpropane, pentaerythritol, and sorbitol. Preferably, propylene glycol is used.

In this case, the surface crosslinking agent is preferably used in an amount of 1 part by weight or less based on 100 parts by weight of the base resin. Here, the amount of the surface crosslinking agent used refers to the total amount of the surface cross-linking agents when two or more of the surface crosslinking agents are used. When the amount of the surface crosslinking agent used is more than 1 part by weight, excessive surface crosslinking may proceed and various physical properties, particularly dryness, of the super absorbent polymer may be deteriorated. In addition, the surface crosslinking agent is preferably used in an amount of 0.01 parts by weight or more, 0.02 parts by weight or more, 0.03 parts by weight or more, 0.04 parts by weight or more, or 0.05 parts by weight or more based on 100 parts by weight of the base polymer.

Moreover, the surface crosslinking solution may further include at least one solvent selected from the group consisting of water, ethanol, ethylene glycol, diethylene glycol, diethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate and N,N-dimethylacetamide. Preferably, water is used. The solvent can be used in an amount of 0.5 to 10 parts by weight based on 100 parts by weight of the base polymer particle.

Furthermore, the surface crosslinking solution may further include aluminum sulfate. The aluminum sulfate may be contained in an amount of 0.02 to 0.3 parts by weight based on 100 parts by weight of the base polymer powder.

Further, the surface crosslinking solution may further include an inorganic filler. The inorganic filler may include silica, aluminum oxide, or silicate. The inorganic filler may be contained in an amount of 0.01 to 0.5 parts by weight based on 100 parts by weight of the base polymer powder.

Further, the surface crosslinking solution may further include a thickener. If the surface of the base polymer powder is further crosslinked in the presence of the thickener, it is possible to minimize the deterioration of the physical properties even after the pulverization. Specifically, as the thickener, at least one selected from a polysaccharide and a hydroxy-containing polymer may be used. The polysaccharide may be a gum type thickener, a cellulose type thickener and the like. Specific examples of the gum type thickener include xanthan gum, arabic gum, karaya gum, tragacanth gum, ghatti gum, guar gum, locust bean gum, and psyllium seed gum. Specific examples of the cellulose type thickener include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, and methylhydroxypropyl cellulose. Meanwhile, specific examples of the hydroxy-containing polymer include polyethylene glycol, polyvinyl alcohol and the like.

Meanwhile, in order to perform the surface crosslinking, a method of placing the surface crosslinking solution and the base polymer into a reaction tank and mixing them, a method of spraying a surface crosslinking solution onto the base polymer, a method in which the base polymer and the surface crosslinking solution are continuously supplied in a continuously operating mixer and mixed, or the like can be used.

In addition, the surface crosslinking may be carried out at a temperature of 100 to 250° C., and may be continuously performed after the drying and pulverizing step proceeding at a relatively high temperature. At this time, the surface crosslinking reaction may be carried out for 1 to 120 minutes, or 1 to 100 minutes, or 10 to 60 minutes. That is, in order to prevent a reduction in physical properties due to damages of the polymer particles by excessive reaction even while inducing the minimal surface crosslinking reaction, the surface modification step may be performed under the above-described conditions.

Advantageous Effects

As described above, the method for preparing a super absorbent polymer according to the present disclosure reduces the generating amount of a fine powder while realizing the same particle size distribution in the process of pulverizing the dried polymer, thereby reducing the load of the fine powder reassembly, drying, pulverizing and classifying steps.

DETAILED DESCRIPTION OF THE EMBODIMENTS

Hereinafter, preferred examples are provided for better understanding of the invention. However, these Examples are given for illustrative purposes only and are not intended to limit the scope of the present disclosure thereto.

Preparation Example 1: Preparation of Dried Product of Hydrogel Polymer

Acrylic acid (00 g), ethylene glycol diglycidyl ether (0.251 g) as a crosslinking agent, sodium persulfate (0.09 g) as an initiator, a photo-initiator (I-819; 0.008 g), sodium hydrogen carbonate (0.14 g) as a foaming agent, caustic soda (NaOH; 38.9 g), and water (144.1 g) were mixed to prepare a monomer mixture having a monomer concentration of 43 wt %. Then, the monomer mixture was fed onto a continuously moving conveyer belt, and subjected to UV polymerization for 1 min under UV light (intensity: 2 mW/cm$^2$) to obtain a hydrogel polymer. The hydrogel polymer was pulverized with a meat chopper (hole size of 16 mm) to obtain a coarsely pulverized hydrogel polymer. This was dried in a hot air dryer at a temperature of 195° C. for 40 minutes to obtain a dried product of the hydrogel polymer.

Example 1

(Step 1)
200 g of the dried product of the hydrogel polymer prepared in the above Preparation Example was subjected to coarse pulverization (primary pulverization) with a Lab Cutter mill (Universal Cutting Mill Pulverisette 19, Fritsch). At this time, the rotation speed of rotor was 500 rpm, the mesh hole diameter was 10 mm, and the gap between the rotor and the stator was adjusted to 1.5 mm. After the coarse pulverization, classification was performed based on diameters of 710 μm and 180 μm. The ratio of particles having a diameter of 710 μm or more relative to the weight of the entire particles was 93.0 wt %, and the ratio of particles (fine powders) having a diameter of 180 μm or less was 1.7 wt %. It was classified into two types of particles having a diameter of 710 μm or more (hereinafter referred to as 'particles 1-1') and particles having a diameter of less than 710 μm (hereinafter referred to as 'particles 1-2'), and the following step 2 was performed.

(Step 2)

After the coarse pulverization, only particles with a diameter of 710 μm or more (particles 1-1) were subjected to fine pulverization (secondary pulverization) with a two-stage Lab Roll mill (Model 66 F Gran-U-Lizer, MPE). At this time, the first-stage roll gap was 0.30 mm, and the two-stage roll gap was 0.16 mm. The pulverized particles were combined with particles with a diameter of less than 710 μm (particles 1-2) prepared in the previous step 1 (hereinafter referred to as "particles 1-3").

The results of classifying the prepared particles (particles 1-3) by diameter are shown in Table 1 below, and the ratio of particles having a diameter of 850 to 600 μm relative to the weight of the entire particles was 6.6 wt %, and the ratio of particles (fine powders) having a diameter of less than 180 μm was 16.8 wt %.

Example 2

(Step 1)

The dried product of the hydrogel polymer prepared in the above Preparation Example was subjected to coarse pulverization (primary pulverization) with a Pilot Cutter mill(28/40 Ro Rotoplex, Hosokawa Alpine) at a rate of 120 kg/h. At this time, the rotation speed of rotor was 460 rpm, the mesh hole diameter was 8 mm, and the gap between the rotor and the stator was adjusted to 0.2 mm. After the coarse pulverization, classification was performed based on diameters of 710 μm and 180 μm. The ratio of particles having a diameter of 710 μm or more relative to the weight of the entire particles was 78.0 wt %, and the ratio of particles (fine powders) having a diameter of 180 μm or less was 7.3 wt %. It was classified into two types of particles having a diameter of 710 μm or more (hereinafter referred to as 'particles 2-1') and particles having a diameter of less than 710 μm (hereinafter referred to as 'particles 2-2'), and the following step 2 was performed.

(Step 2)

After the coarse pulverization, only particles with a diameter of 710 μm or more (particles 2-1) were subjected to fine pulverization (secondary pulverization) with a three-stage Pilot Roll mill (Model 666 F Gran-U-Lizer, MPE). At this time, the first-stage roll gap was 0.30 mm, the two-stage roll gap was 0.28 mm, and the three-stage roll gap was 0.25 mm. The pulverized particles were combined with particles with a diameter of less than 710 μm (particles 2-2) prepared in the previous step 1 (hereinafter referred to as "particles 2-3").

The results of classifying the prepared particles (particles 2-3) by diameter are shown in Table 1 below, the ratio of particles having a diameter of 850 to 600 μm relative to the weight of the entire particles was 7.4 wt %, and the ratio of particles (fine powders) having a diameter of less than 180 μm was 13.9 wt %.

Example 3

(Step 1)

The same procedure as in step 1 of Example 2 was performed, except that the rotation speed of rotor of the Lab Cutter mill was changed to 230 rpm. After the coarse pulverization, classification was performed based on diameters of 710 μm and 180 μm. The ratio of particles having a diameter of 710 μm or more relative to the weight of the entire particles was 85.6 wt %, and the ratio of particles (fine powders) having a diameter of 180 μm or less was 4.0 wt %. It was classified into two types of particles having a diameter of 710 μm or more (hereinafter referred to as 'particles 3-1') and particles having a diameter of less than 710 μm (hereinafter referred to as 'particles 3-2'), and the following step 2 was performed.

(Step 2)

After coarse pulverization, only particles with a diameter of 710 μm or more (particles 3-1) were subjected to fine pulverization (secondary pulverization) with a Pilot Roll mill (Model 666 F Gran-U-Lizer, MPE). At this time, the first-stage roll gap was 0.30 mm, the two-stage roll gap was 0.28 mm, and the three-stage roll gap was 0.23 mm. The pulverized particles were combined with particles with a diameter of less than 710 μm (particles 3-2) prepared in the previous step 1 (hereinafter referred to as "particles 3-3").

The results of classifying the prepared particles (particles 3-3) by diameter are shown in Table 1 below, and the ratio of particles having a diameter of 850 to 600 μm relative to the weight of the entire particles was 7.9 wt %, and the ratio of particles (fine powders) having a diameter of less than 180 μm was 12.9 wt %.

Example 4

(Step 1)

The same procedure as in step 1 of Example 2 was performed, except that the rotation speed of the rotor of the Lab Cutter mill was changed to 173 rpm. After the coarse pulverization, classification was performed based on a diameter of 710 μm and 180 μm. The ratio of particles having a diameter of 710 μm or more relative to the weight of the entire particles was 85.9 wt %, and the ratio of particles (fine powders) having a diameter of 180 μm or less was 3.1 wt %. It was classified into two types of particles having a diameter of 710 μm or more (hereinafter referred to as 'particles 4-1') and particles having a diameter of less than 710 μm (hereinafter referred to as 'particles 4-2'), and the following step 2 was performed.

(Step 2)

After coarse pulverization, only particles with a diameter of 710 μm or more (particles 4-1) were subjected to fine pulveration (secondary pulverization) with a Pilot Roll mill (Model 666 F Gran-U-Lizer, MPE). At this time, the first-stage roll gap was 0.30 mm, the two-stage roll gap was 0.28 mm, and the three-stage roll gap was 0.25 mm. The pulverized particles were combined with particles with a diameter of less than 710 μm (particles 4-2) prepared in the previous step 1 (hereinafter referred to as "particles 4-3").

The results of classifying the prepared particles (particles 4-3) by diameter are shown in Table 1 below, and the ratio of particles having a diameter of 850 to 600 μm relative to the weight of the entire particles was 7.7 wt %, and the ratio of particles (fine powders) having a diameter of less than 180 μm was 12.5 wt %.

Comparative Example 1

(Step 1)

200 g of the dried product of the hydrogel polymer prepared in the above Preparation Example was subjected to coarse pulverization (primary pulverization) with a Lab Cutter mill(Universal Cutting Mill Pulverisette 19, Fritsch). At this time, the rotation speed of rotor was 2800 rpm, the mesh hole diameter was 8 mm, and the gap between the rotor and the stator was adjusted to 0.4 mm. After the coarse pulverization, classification was performed based on diameters of 710 μm and 180 μm. The ratio of particles having a diameter of 710 μm or more relative to the weight of the entire particles was 64.6 wt %, and the ratio of particles (fine powders) having a diameter of 180 μm or less was 9.8 wt %. It was classified into two types of particles having a diameter of 710 μm or more (hereinafter referred to as 'particles C1-1') and particles having a diameter of less than 710 μm (hereinafter referred to as 'particles C1-2'), and the following step 2 was performed.

(Step 2)

After coarse pulverization, only particles with a diameter of 710 μm or more (particles C-1) were subjected to fine pulverization (secondary pulverization) with a two-stage Lab Roll mill(Model 66 F Gran-U-Lizer, MPE). At this time, the first-stage roll gap was 0.30 mm, and the two-stage roll gap was 0.15 mm. The pulverized particles were combined with particles with a diameter of less than 710 μm (particles C1-2) prepared in the previous step 1 (hereinafter referred to as "particles C1-3").

The results of classifying the prepared particles (particles C1-3) by diameter are shown in Table 1 below, and the ratio of particles having a diameter of 850 to 600 μm relative to the weight of the entire particles was 6.5 wt %, and the ratio of particles (fine powders) having a diameter of less than 180 μm was 20.0 wt %.

Comparative Example 2

(Step 1)

The same procedure as in step 1 of Example 2 was performed, except that the rotation speed of rotor of the Lab Cutter mill was changed to 690 rpm. After the coarse pulverization, classification was performed based on diameters of 710 μm and 180 μm. The ratio of particles having a diameter of 710 μm or more relative to the weight of the entire particles was 68.2 wt %, and the ratio of particles (fine powders) having a diameter of 180 μm or less was 11.7 wt %. It was classified into two types of particles having a diameter of 710 μm or more (hereinafter referred to as 'particles C2-1') and particles having a diameter of less than 710 μm (hereinafter referred to as 'particles C2-2'), and the following step 2 was performed.

(Step 2)

After the coarse pulverization, only particles with a diameter of 710 μm or more (particles C2-1) were subjected to fine pulverization (secondary pulverization) with a three-stage Pilot Roll mill (Model 666 F Gran-U-Lizer, MPE). At this time, the first-stage roll gap was 0.30 mm, the two-stage roll gap was 0.28 mm, and the three-stage roll gap was 0.23 mm. The pulverized particles were combined with particles with a diameter of less than 710 μm (particles C2-2) prepared in the previous step 1 (hereinafter referred to as "particles C2-3").

The results of classifying the prepared particles (particles C2-3) by diameter are shown in Table 1 below, and the ratio of particles having a diameter of 850 to 600 μm relative to the weight of the entire particles was 7.3 wt %, and the ratio of particles (fine powders) having a diameter of less than 180 μm was 17.2 wt %.

Experimental Example

With respect to the particles (particles 1-3, 2-3, 3-3, 4-3, C1-3, and C2-3) prepared in the above Examples and Comparative Examples, the following physical properties were measured for the remaining particles except for the particles having a diameter of less than 180 μm (fine powders).

(1) Bulk Density (B/D)

100 g of the particles of the above Examples and Comparative Examples were flowed through a standard fluidity measuring device orifice and received in a container with a volume of 100 ml, the particles were cut so as to be horizontal, and the volume of the particles was adjusted to 100 ml. Then, the weight of only the particles excluding the container was measured. The weight of only the particles was then divided by 100 ml, which is the volume of the particles, to obtain the bulk density corresponding to the weight of the particles per unit volume.

(2) Vortex 50 mL of a 0.9 wt % NaCl solution was put in a 100 mL beaker, and then 2 g of each particle prepared in Examples and Comparative Examples was added thereto while stirring at 600 rpm using a stirrer. Then, the vortex time was calculated by measuring the amount of time until a vortex of the liquid caused by the stirring disappeared and a smooth surface was formed, and the result was shown as the vortex removal time.

The results are shown in Table 1 below.

TABLE 1

| | | | Unit | Ex. 1 | Comparative Ex. 1 | Ex. 2 | Ex. 3 | Ex. 4 | Comparative Ex. 2 |
|---|---|---|---|---|---|---|---|---|---|
| Coarse pulverization | Rotor Speed | | rpm | 500 | 2800 | 460 | 230 | 173 | 690 |
| | Hole Size | | mm | 10 | 8 | 8 | 8 | 8 | 8 |
| | Clearance | | mm | 1.5 | 0.4 | 0.2 | 0.2 | 0.2 | 0.2 |
| | Particles with diameter of 710 μm | | wt % | 93.0 | 64.6 | 78 | 85.6 | 85.9 | 68.2 |
| | Particles with a diameter of 180 μm or less | | wt % | 1.7 | 9.8 | 7.3 | 4.0 | 3.1 | 11.7 |
| Finely pulverizing | Roll Gap/ Corrugation | 1-stage | mm/ (cut/ inch) | 0.30/8 | 0.30/8 | 0.30/6 | 0.30/6 | 0.30/6 | 0.30/6 |
| | | 2-stage | | 0.16/16 | 0.15/16 | 0.28/8 | 0.28/8 | 0.28/8 | 0.28/8 |
| | | 3-stage | | — | — | 0.25/16 | 0.23/16 | 0.25/16 | 0.23/16 |

TABLE 1-continued

| | | Unit | Ex. 1 | Comparative Ex. 1 | Ex. 2 | Ex. 3 | Ex. 4 | Comparative Ex. 2 |
|---|---|---|---|---|---|---|---|---|
| Particle size distribution | 850-600 μm | wt % | 6.6 | 6.5 | 7.4 | 7.9 | 7.7 | 7.3 |
| | 600-425 μm | wt % | 36.7 | 32.7 | 38.0 | 39.9 | 40.1 | 35.0 |
| | 425-300 μm | wt % | 26.8 | 26.4 | 26.0 | 25.8 | 26.2 | 25.1 |
| | 300-180 μm | wt % | 13.1 | 14.5 | 14.6 | 13.5 | 13.5 | 15.2 |
| | 180 μm or less | wt % | 16.8 | 20.0 | 13.9 | 12.9 | 12.5 | 17.2 |
| Relative fine powder generating amount[1] | | % | 20.2 | 25.0 | 16.1 | 14.8 | 14.3 | 20.7 |
| B/D | | g/ml | 0.51 | 0.53 | 0.49 | 0.50 | 0.49 | 0.51 |
| Vortex | | second | 36 | 38 | 41 | 41 | 39 | 41 |

[1] A value obtained by dividing the weight of particles having a particle size of 180 μm or less by the weight of particles having a particle size of 850 to 180 μm.

When comparing the above Examples and Comparative Examples, it can be confirmed that as a result of increasing the rotor speed of the coarse pulverizing machine and the diameter of the mesh hole, and adjusting so that many particles with a diameter of 710 μm or more were prepared, the generation of particles (fine powders) having a diameter of 180 μm or less was significantly reduced. In addition, it can be confirmed that even when finely pulverized to have a similar particle size distribution, the generation of fine powders was reduced, and it can be confirmed that there was no significant difference in the physical properties of the prepared particles. Therefore, it can be confirmed that the generation of a fine powder could be reduced even while implementing the existing physical properties.

The invention claimed is:

1. A method for preparing a super absorbent polymer comprising:
    performing crosslinking polymerization of a water-soluble ethylenically unsaturated monomer having an acidic group of which at least a part is neutralized, in the presence of an internal crosslinking agent and a polymerization initiator to form a hydrogel polymer containing a first crosslinked polymer;
    drying the hydrogel polymer to form a dried polymer;
    pulverizing the dried polymer to prepare pulverized particles so that particles having a diameter of 710 μm in or more are present in an amount of 75 wt % to 90 wt % and particles having a diameter of less than 180 μm are present in an amount of 8.0 wt % or less based on a total weight of the pulverized particles; and
    subjecting the pulverized particles to secondary pulverization,
    wherein during the secondary pulverization, a reference diameter is determined from a diameter range of 600 μm or more and 850 μm or less, and only particles having a diameter equal to or greater than the reference diameter among the pulverized particles are subjected to the secondary pulverization,
    wherein the reference diameter is 710 μm.

2. The preparation method of claim 1, wherein the crosslinking polymerization is performed in the presence of a foaming agent.

3. The preparation method of claim 1, wherein particles subjected to the secondary pulverization are combined with particles not subjected to secondary pulverization among the pulverized particles.

4. The preparation method of claim 3, further comprising classifying the pulverized particles into particles having a diameter of 850 μm or less and 150 μm or more and particles having a diameter of less than 150 μm.

5. The preparation method of claim 1, wherein among the pulverized particles, particles having a diameter of less than 150 μm are assembled by adding water, and circulated to be included in the drying the hydrogel polymer.

* * * * *